(12) United States Patent
Hars

(10) Patent No.: US 6,889,236 B2
(45) Date of Patent: May 3, 2005

(54) GAP AVERAGE ON-LINE RANDOMNESS TEST

(75) Inventor: Laszlo Hars, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 584 days.

(21) Appl. No.: 10/107,008

(22) Filed: Mar. 26, 2002

(65) Prior Publication Data

US 2003/0187890 A1 Oct. 2, 2003

(51) Int. Cl.⁷ .................................................. G06F 1/02
(52) U.S. Cl. ...................................... 708/250; 702/179
(58) Field of Search ................................ 708/250, 251, 708/252, 253, 254, 255, 256; 702/75, 179

(56) References Cited

U.S. PATENT DOCUMENTS 3,217,145 A * 11/1965 Suski ............................ 377/1
4,977,596 A * 12/1990 Maestas et al. ............. 380/260
5,781,458 A * 7/1998 Gilley ......................... 708/255

OTHER PUBLICATIONS

"Efficient Online Tests for True Random No. Generators", by Werner Schindler, XP–001061161, 2001, pp. 103–117.
"The Art of Computer Programming", Knuth Donald Ervin, vol. 2, XP–002248905, Aug. 2000,p. 61–75.

* cited by examiner

Primary Examiner—Dhuong Dinh Ngo
(74) Attorney, Agent, or Firm—Kevin Simons

(57) ABSTRACT

The present invention is a method and apparatus for testing random numbers generated by a random number generator in real time. A stream of random bits is generated using said random number generator, then the generated random bits undergo a gap length calculation operation in which all sub-sequences having identical bit patterns are identified and the resulting gap lengths are applied to exponential averaging to obtain average gap lengths between identical bit patterns. The average gap lengths are compared to at least one predetermined acceptance range, so that if at least one of the average gap lengths falls repeatedly outside the predetermined acceptance range more than a predetermined number of times, it is determined that the generated random bits are insufficiently random.

19 Claims, 2 Drawing Sheets

| A | $t_1$ | $t_2$ | $t_3$ | ... | ... |
|---|---|---|---|---|---|
| $b_1$ | 2 | | | | |
| $b_2$ | | | | | |
| $b_3$ | | | | | |
| ⋮ | | 4 | | | |
| | | | 3 | | |
| $b_k$ | | | | | |

GAP AVERAGE ON-LINE RANDOMNESS TEST

BACKGROUND OF THE INVENTION

1. Field of the Invention

The present invention pertains to the field of random number generators and, in particular, to a digital data processing apparatus and method for generating true binary random sequences.

2. Description of the Related Art

Random-number generators are fundamentally important in this computer age. A truly random sequence is difficult to generate in real application. For example, heat is typically generated in the hardware component of the random number generator when it generates a series of 1's and 0's over a time period. Generating a 1 bit could consume more power than a 0 bit. As such, if a long sequence of 1 bits is generated, the electrical circuit becomes hot. Thus, if the circuit generates a 1 bit when it is hot, the circuit will "latch up" and generate mostly 1 bits but rarely a 0 bit. A different effect may occur if a 0 bit is generated when the circuit is hot. In this case a long sub-sequence of 1 bits becomes too rare and constitutes a non-random property. In random sequences where occasionally long sub-sequences consist of equal bits of long 0's or 1's, the biased 0/1 frequency error will have catastrophic consequences of breaching security.

Accordingly, both the detection of hardware tampering and a component failure are necessary when conducting randomness tests. Conventional randomness tests are performed through extensive statistical testing, such as chi-squared tests, delta tests, and the like, on a sequence of generated random numbers. However, such tests are very expensive to be performed in real time as they require a great amount of computational processing power.

SUMMARY OF THE INVENTION

The present invention overcomes the above-described problems, and provides additional advantages by providing a method and apparatus for providing an on-line randomness test to ensure that the generated random numbers are less susceptible to crypto-analysis by an unauthorized party.

According to an aspect of the invention, a method for testing randomness of a stream of random numbers includes the steps of: generating a continuous stream of random binary bits; applying the generated random bits to an exponential average gap calculation to compute average gap lengths between occurrences of identical bit patterns; and, determining whether the generated random bits are sufficiently random by comparing the output of the exponential gap operation to a predetermined acceptance range. The method further includes the steps of determining that the generated random bits are insufficiently random when at least one of the average gap lengths falls repeatedly outside the predetermined acceptance range more than a predefined number of times; notifying that the generated random bits are insufficiently random when at least one of the average gap lengths falls repeatedly outside the predetermined acceptance range more than a predefined number of times; and, generating a new set of random bits when at least one of the average gap lengths falls repeatedly outside the predetermined acceptance range more than a predefined number of times, or alternatively, denying the generated random bits for a subsequent application when at least one of the average gap lengths falls repeatedly outside the predetermined acceptance range more than a predefined number of times. In the embodiment, the identical bit patterns comprise a fixed number of consecutive bits from the generated random bits.

According to another aspect of the invention, a method for evaluating the random numbers generated by a random number generator includes the steps of: (a) generating a stream of random bits using the random-number generator; (b) applying the generated random bits to a gap length calculation; (c) applying the output of the gap length calculation to an exponential averaging to obtain the average gap lengths between occurrences of identical bit patterns; (d) comparing the average gap lengths to a predetermined acceptance range; and, (e) determining whether at least one of the average gap lengths falls outside the predetermined acceptance range more than a predefined number of times, and if so, determining that the generated random bits are insufficiently random when any of the average gap lengths falls outside the predetermined acceptance range more than the predefined number of times. If each average gap length falls inside the predetermined acceptance range, repeating the steps (a)–(e) until at least one of the average gap lengths falls outside the predetermined acceptance range, and notifying that insufficiently random numbers are generated when the steps (a)–(e) are repeated more than the predefined number of times. In the embodiment, if steps (a)–(e) are repeated more than the predefined number of times, a new set of random numbers is generated.

According to a further aspect of the invention, an apparatus for evaluating the random numbers generated by a random number generator includes: means for generating random sequences comprising binary bits; means for detecting whether the generated random sequences are insufficiently random based on an exponential average gap length operation; and, means for controlling the flow of the generated random sequences for a subsequent application when the generated random sequences are determined to be insufficiently random, wherein the exponential average gap operation is performed to compute average gap lengths between identical bit patterns and wherein, if at least one of the average gap lengths repeatedly falls outside a predetermined acceptance range more than a predefined number of times, determining that the generated random sequences are insufficiently random. The apparatus further includes means for transmitting an alarm signal that the generated random sequences are insufficiently random when at least one of the average gap lengths falls repeatedly outside the predetermined acceptance range more than the predefined number of times, and means for generating a new set of random bits when at least one of the average gap lengths falls repeatedly outside the predetermined acceptance range more than the predefined number of times.

Yet another aspect is that the present invention may be implemented in hardware, software, or a combination of hardware and software as desired for a particular application.

Furthermore, the present invention may be realized in a simple, reliable, and inexpensive implementation.

These and other advantages will become apparent to those skilled in this art upon reading the following detailed description in conjunction with the accompanying drawings.

DETAILED DESCRIPTION OF THE EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
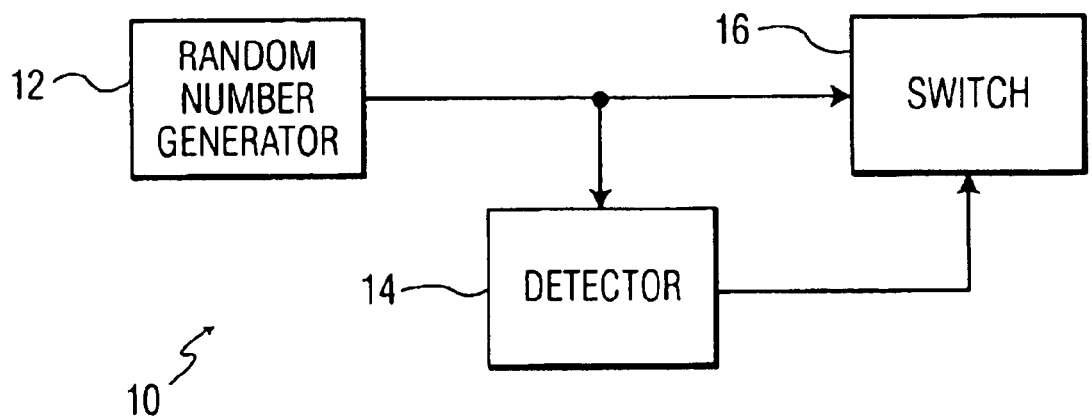
FIG. 1 illustrates a simplified block diagram of the random-number generating module according to an embodiment of the present invention.

FIG. 1 illustrates a simplified block diagram of a random-number-generating system 10 according to an exemplary embodiment of the present invention. The system 10 includes a random-number generator (RG) 12 for generating a series of random numbers, a detector 14, and a switch 16. In this disclosure, "random number" represents any sequence of binary signals, a Gaussian or any other distribution of signals, a sequence of signals representing a number between zero and one, a sequence of signals representing a decimal number, or any other form that includes the desired randomness. As such, the RG 12 in this disclosure means any device that produces a signal that can be converted to a sequence of binary bits in any conventional or unconventional manner. The switch 16 may represent an input to a cryptography system, an audio or video noise generator, a computer program, or other devices and processes.

In operation, as the random numbers are generated by the random number generator 12, the detector 14 detects whether the generated random numbers are truly random sequences according to predetermined criteria (explained later). If they are determined to be truly random, the switch 16 allows the generated random numbers for a subsequent application, such as any circuit, system, process, gambling application, simulation, statistical sampling, Diffie-Hellman key exchanges, or the like which uses the random numbers supplied by the RG 12. However, the switch 16 stops the flow of the generated random numbers when the generated random numbers are deemed insufficiently random by the detector 14. Alternatively, a new set of random numbers may be generated if they are determined to be insufficiently random.

Now, a description will be made in detail in regards to determining whether the generated random numbers are sufficiently random with reference to FIGS. 2 and 3.

Figure 2:
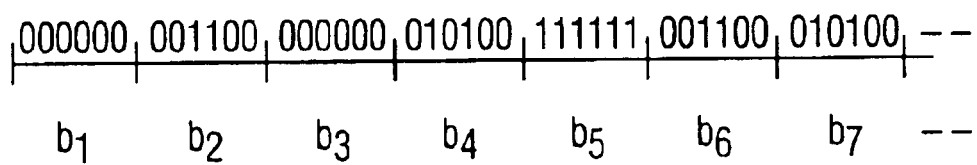
FIG. 2 shows a diagram showing the randomness test performed on a sequence of random numbers according to an embodiment of the present invention; and, FIG. 3 is a flow chart illustrating the operation steps of testing the statistics of the generated random numbers according to an embodiment of the present invention.

Referring to FIG. 2, the random numbers are tested in real time while the RG 12 is in operation to ensure that the generated random numbers are sufficiently random according to an embodiment of the present invention. As a continuous stream of random bits generated by the RG 12, the detector 14 computes average gap lengths between occurrences of the same bit patterns, then the average gap distribution of identical bit sequences is compared to an ideal gap range or a predetermined acceptance range to determine whether the generated random number sequences are sufficiently random. Thus, the sensitivity of testing randomness can be adjusted by relaxing or tightening the acceptance range. As discussed further hereinafter, the averaging process is performed using an exponential averaging process. It should be noted that there are various counting and averaging methods that can be implemented in accordance with the techniques of the present invention; however, exponential averaging is preferably used, as described below. Furthermore, the exact acceptance range is obtained through extensive simulation with a known, good source of random numbers.

As shown in FIG. 2, each time a new random bit is generated, the new bit is appended to the sequence of previous bits until k bits are collected. FIG. 2 illustrates a group of 6 bits as a unit of k bits for illustrative purposes; however, it should be understood that the present invention can support any positive integer number of k bits. Thus, the grouping of 6 bits in the drawing should not impose limitations on the scope of the invention. The exponential average accumulators, A, are initialized for each possible $b_n$ pattern ($0 \le n < 2^k$). Also, the time is recorded when this bit pattern last occurred. The gap between occurrences is defined by the difference of the recorded time of the last occurrence and the current time. As shown in FIG. 2, the gap corresponding to the pattern "000000" is 2 as the pattern occurs in block, $b_1$, and block, $b_3$. The gap corresponding to the pattern "001100" is 4 as the pattern occurs in block, $b_2$, and block, $b_6$. The gap corresponding to "010100" is 3 as the pattern occurs in block, $b_4$, and block, $b_7$. As the gap between occurrences of the same bit patterns is determined, the average-gap counter is updated. The corresponding accumulator is indexed by the current bit pattern, $b_n$, which is treated as a binary number.

Note that the random number generator and the randomness test run continuously, so the time values indicating when a particular bit pattern occurs grow indefinitely. However, gaps of 10 times the expected gap length occur very rarely, 1000 times longer gaps occur almost never. Therefore, k+6 . . . 10 bits are almost always enough for calculating the gaps exactly. Accordingly, a preferred number of the least significant bits of the stored time values used in the present invention ranges between k+6 and k+10. In this data representation, the gap lengths, which are differences of time values, need to be calculated based on a circular order.

In the embodiment, the gap average counting process runs continuously. As such, the counters or accumulators A must be cleared periodically to avoid overflow. To this end, an exponential averaging is utilized in the present invention, in which the accumulator A is decreased with a certain $0 < \alpha < 1$ factor before the averaging addition is performed, so it never becomes too large. That is, to save storage and execution time, exponential averaging is applied in the present invention to keep track of the actual average gap lengths. The exponential averaging has the property that each time the average is updated in an accumulator A, the old averaged values will have a diminishing effect. It should be noted that there are various counting methods that can be implemented in accordance with the techniques of the present invention; however, exponential averaging is preferably used, as described below.

The exponential averaging works in the following way. Each time a numeric value b is obtained, which has to be averaged, a factor, $\alpha$, which falls between 0 and 1 ($0 < \alpha < 1$), is multiplied to the accumulator A and then b is added to it: $A_{new} = \alpha \cdot A_{old} + b$. In this application b represents the gap length between occurrences of the same bit patterns. To have useful averaging effects, the value for a is selected to be close to 1, $\alpha=1-1/n, n\gg 1$. In this case, $\log \alpha \approx -1/n$ and the half-life of the averaged numbers is $k \approx n \cdot \log 2 \approx 0.30103\,n$. After n steps, the weight of the oldest averaged value becomes $(1-1/n)^n \approx 1/e \approx 0.367879$. Here, e is the basis of the natural logarithm (the Euler constant), so the term, n, can be referred to as the natural life of the averaged values. If all values to be averaged were 1's, the accumulator value is $1+\alpha+\alpha^2+\ldots =1/(1-\alpha)=n$, whereas if all bits were 0's the accumulator value is 0. Note that the expected value of the exponential average is the exponential average of the expected values of the individual random variables. If they are evenly distributed binary bits, the expected value is $\frac{1}{2}+\frac{1}{2}\alpha+\frac{1}{2}\alpha^2+\ldots =n/2$.

As described above, the exponential averaging serves to clear the counter as the accumulator is decreased with a certain $0<\alpha<1$ factor; thus, the accumulator never becomes too large during the operation mode. Once the exponential averaging is performed for each accumulator, the value of exponential averaging is compared to a predetermined acceptance range. That is, it is determined whether the generated random number pattern will be substantially random by comparing the value of each accumulator to the predetermined acceptance range value. If the value of any accumulator falls out of the predetermined range value during the averaging process, it is inferred that the generated random numbers would not be sufficiently random. Here, a threshold value may be set to notify the user when the test fails repeatedly. The exact boundary can be selectively adjusted based on the data obtained from extensive simulations with a known, good source of random numbers, in which an ideal gap distribution can be obtained. Such random sequences are commercially available and can be downloaded, for example, from various web sources, including "www.fourmilab.ch/hotbits" and "lavarand.sgi.com." Thus, the actual range used in the test is selectively set by an operator so that a choice can be made of different sensibilities as to whether the generated random sequence is predictable to an unauthorized party.

Figure 3:
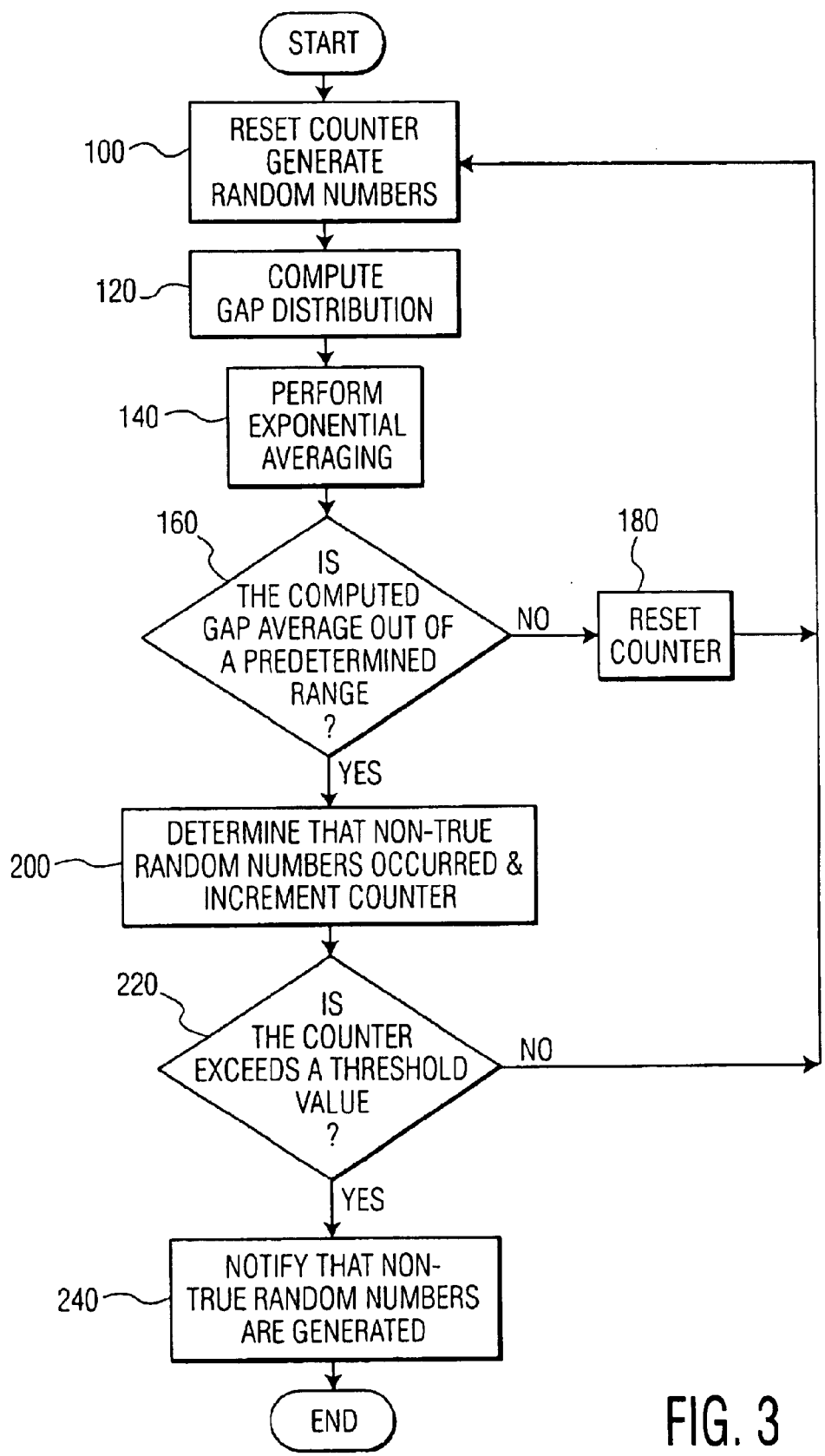

FIG. 3 is a flow chart illustrating the operation steps for testing the statistical quality of the random sequence in accordance with the present invention. The rectangular elements indicate computer software instruction, whereas the diamond-shaped element represents computer software instructions that affect the execution of the computer software instructions represented by the rectangular blocks. Alternatively, the processing and decision blocks represent steps performed by functionally equivalent circuits such as a digital signal processor circuit or an application-specific-integrated circuit (ASIC). It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

As shown in FIG. 3, the randomness test is initiated upon generating a continuous stream of random binary bits by the random-number generator 12 in step 100. In step 120, the generated random bits undergo a gap average test, in which a gap distribution between identical bit patterns of a specified length is computed. Each time a gap between the same bit patterns is found, a set of exponential average gap values is updated in each accumulator in step 140. Here, all previous exponential average gap values are reduced by a factor $\alpha$ ($0<\alpha<1$), then the new gap length is added to the corresponding accumulator, such that the old average gap values will have a diminishing effect.

Thereafter, the average gap values after undergoing the exponential averaging operation are compared to a predetermined acceptance range or respective predetermined acceptance ranges in step 160. If any of the values in each accumulator A is outside the predetermined acceptance range, it is determined that non-random patterns have been detected in step 200, and the counter is increased by 1. Otherwise, the counter is reset in step 180 and returns to step 100 of processing random numbers. In step 220, if the value of the counter is greater than a threshold value, a notification that the generated random numbers are not sufficiently random is transmitted in step 240. Alternatively, the switch 16 can be deactivated to stop the flow of the random numbers for a subsequent application. Then, the generated random numbers can be discarded, and the whole process of generating new random numbers can be initiated. If the value of the counter does not exceed the threshold value in step 220, the process of generating random numbers is repeated.

The various steps described above may be implemented by programming them into functions incorporated within application programs, and programmers of ordinary skill in the field can implement them using customary programming techniques in languages, such as C, Visual Basic, Java, Perl, C++, and the like. In an exemplary embodiment, the method described in FIG. 3 may be constructed as follows (using the C programming language). For simplicity we implemented the test using floating-point arithmetic.

APPENDIX

MS Visual C code

```
/*****************************************************************\
*    GapAvg.c
*        GapAvg <#random words> <bit generator type> <bit generator param>
*        Generates test bits
*        Performs GapAvg test on 6 bit words (non-overlapping)
*            Cyclic 16-bit counters determine the gaps between occurances of words
*            Exponential averaging of the gaps
*        Prints test statistics
*
*    ANOTHER TEST HAS TO VERIFY EQUAL WORD-FREQUENCIES
*
*    GapAvg 5e7 0 0.5
*    Min Max of exponential gap statistics of 6-bit words = 58763.3 73812.8
*
*    GapAvg 5e6 0 0.49
```

APPENDIX-continued

MS Visual C code

```
*   Too large bias at word 66058 in 6-bit word gap statistics 74003.8 [58500 74000]
*
*   GapAvg 5e6 2 6 0 1 63 [ all 6 bit words ]
*   Min Max of exponential gap statistics of 6-bit words = 65536 65899.6
*
*   GapAvg 5e6 2 6 0 1 57 [ 58/64 regularly paced words pass: gaps decrease but no fluctuation ]
*   Min Max of exponential gap statistics of 6-bit words = 59392 65893.6
*
*   GapAvg 1e6 2 6 0 1 56 [ 57/64 regularly paced words fail ]
*   Too large bias at word 236499 in 6-bit word gap statistics 58499.9 [58500 74000]
*
*   Vers. 1.0  04/22/01: Created by Laszlo Hars
*
\*****************************************************************/
#include <stdio.h>
#include <stdlib.h>
// Multiplyer = 1-1/2^10
#define W           0.9990234375
#define W0          6.59e4
#define LO          5.85e4
#define HI          7.40e4
#define WDLEN       6
#define WDNUM       (1<<WDLEN)
#define MAX(A,B)    ((A) > (B) ? (A) : (B))
#define MIN(A,B)    ((A) < (B) ? (A) : (B))
#define MASK16      ((1<<16)-1)
typedef unsigned __int16 uint16; // 16 bit counters with cyclic difference
// External function prototypes
void BitGenInit( int argc, char *argv[ ]);
unsigned int NextBit( );
int main (int argc, char *argv[ ])
{
    int d, i, k, wd, n = (int)atof(argv[1]);
    uint16 c[WDNUM];
    double s[WDNUM], smin = 1e9, smax = 0;
    if( argc < 4) {
        printf("Usage: GapAvg <#random words> <bit generator type> <bit generator params. . .>\n");
        putchar('\a');              // rings the bell
        exit(1);   }
    BitGenInit(argc, argv);
    for(i = 0; i < WDNUM; ++i)       // Initialize running average
        s[i] = W0;
    for(i = 0; i < 9*WDNUM; ++i) {   // Initialize counters
        wd = NextBit( );
        for(k = 1; k < WDLEN; ++k)
            wd = (wd<<1) + NextBit( );
        c[wd] = (i & MASK16);
    }
    for(i = 9*WDNUM; 1 < n; ++i) {
        wd = NextBit( );
        for(k = 1; k < WDLEN; ++k)
            wd = (wd<<1) + NextBit( );
        d = (i & MASK16) - c[wd];
        c[wd] = (i & MASK16);
        if (d <= 0) d = d + MASK16+1;    // circular count
        s[wd] = s[wd]*w + d;              // Exponential averaging
        smax = MAX(s[wd],smax);           // for fine-tuning the acceptance range
        smin = MIN(s[wd],smin);
        if( s[wd] < LO || s[wd] > HI ) {
           printf("Too large bias at word %d in 6-bit word gap statistics %g [%g %g]\n",i,s[wd],LO,HI);
           exit(2); }
    }
    printf("Min Max of exponential gap statistics of 6-bit words = %g %g\n", smin, smax);
}
```

While the preferred embodiments of the present invention have been illustrated and described, it will be understood by those skilled in the art that various changes and modifications may be made and equivalents substituted for elements thereof without departing from the true scope of the present invention. In addition, many modifications can be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for testing randomness of a stream of random numbers, the method comprising the steps of:
   generating a continuous stream of random binary bits;
   applying said generated random bits to an exponential average gap calculation to compute an average gap length between at least two identical bit patterns; and, determining whether said generated random bits are sufficiently random by comparing the output of said exponential gap operation to a predetermined acceptance range.

2. The method of claim 1, further comprising the step of determining that said generated random bits are insufficiently random when at least one of the average gap lengths falls repeatedly outside said predetermined acceptance range more than a predefined number of times.

3. The method of claim 1, further comprising the step of notifying that said generated random bits are insufficiently random when at least one of the average gap lengths falls repeatedly outside said predetermined acceptance range more than a predefined number of times.

4. The method of claim 1, further comprising the step of generating a new set of random bits when at least one of the average gap lengths falls repeatedly outside said predetermined acceptance range more than a predefined number of times.

5. The method of claim 1, wherein said identical bit patterns comprise a fixed number of consecutive bits from the generated random bits.

6. The method of claim 1, further comprising the step of denying said generated random bits for a subsequent application when at least one of the average gap lengths falls repeatedly outside said predetermined acceptance range more than a predefined number of times.

7. A method for evaluating the random numbers generated by a random number generator, the method comprising the steps of:

(a) generating a stream of random bits using said random-number generator;

(b) applying said generated random bits to a gap length calculation;

(c) applying the output of said gap length calculation to an exponential averaging to obtain average gap lengths between at least two identical bit patterns;

(d) comparing the average gap lengths to a predetermined acceptance range; and, (e) determining whether at least one of the average gap lengths falls outside said predetermined acceptance range more than a predefined number of times.

8. The method of claim 7, further comprising the step of determining that said generated random bits are insufficiently random when any of the average gap lengths falls outside said predetermined acceptance range more than said predefined number of times.

9. The method of claim 7, further comprising the step of:

if each average gap length falls inside said predetermined acceptance range, repeating said steps (a)–(e) until at least one of the average gap lengths falls outside said predetermined acceptance range.

10. The method of claim 9, further comprising the step of notifying that insufficiently random numbers are generated when said steps (a)–(e) are repeated more than said predefined number of times.

11. The method of claim 9, further comprising the step of generating a new set of random numbers when said steps (a)–(e) are repeated more than said predefined number of times.

12. The method of claim 7, wherein said identical bit patterns comprise a fix number of consecutive bits from the said generated random bits.

13. An apparatus for evaluating the random numbers generated by a random number generator, comprising:

means for generating random sequences comprising binary bits;

means for detecting whether said generated random sequences are insufficiently random based on an exponential average gap operation; and, means for controlling the flow of said generated random sequences for a subsequent application when said generated random sequences are determined to be insufficiently random, wherein said exponential average gap operation is performed to compute average gap lengths between at least two identical bit patterns and wherein, if at least one of the average gap lengths repeatedly falls outside a predetermined acceptance range more than a predefined number of times, determining that said generated random sequences are insufficiently random.

14. The apparatus of claim 13, further comprising means for transmitting an alarm signal that said generated random sequences are insufficiently random when at least one of the average gap lengths falls repeatedly outside said predetermined acceptance range more than said predefined number of times.

15. The method of claim 13, further comprising means for generating a new set of random bits when at least one of the average gap lengths falls repeatedly outside said predetermined acceptance range more than said predefined number of times.

16. A machine-readable medium having stored thereon data representing sequences of instructions, and the sequences of instructions which, when executed by a processor, cause the processor to:

process a continuous stream of random binary bits;

apply said generated random bits to an exponential gap length operation to compute average gap lengths between at least two identical bit patterns; and, determine whether said generated random bits are insufficiently random by comparing the output of said exponential gap count to a predetermined acceptance range.

17. The memory medium of claim 16, wherein said generated random numbers are determined to be insufficiently random when at least one of the average gap lengths falls outside said predetermined acceptance range.

18. The memory medium of claim 16, wherein said processor is further operative to process a new set of random bits when at least one of the average gap lengths falls outside said predetermined acceptance range.

19. The memory medium of claim 16, wherein said processor is further operative to deny said generated random bits for a subsequent application when at least one of the average gap lengths falls repeatedly outside said predetermined acceptance range more than a predefined number of times.

* * * * *